Figure 1:
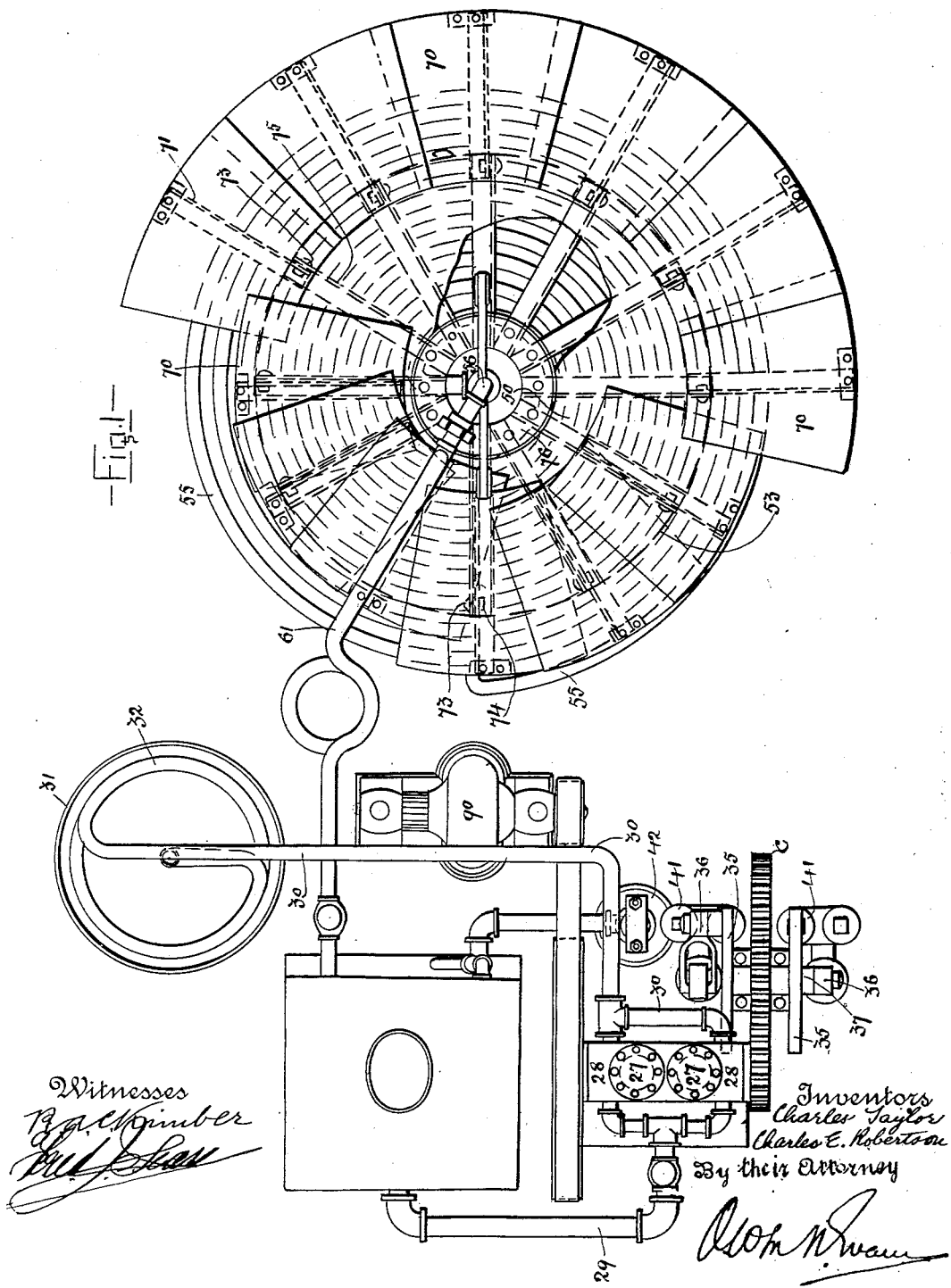

No. 633,627. Patented Sept. 26, 1899.
C. TAYLOR & C. E. ROBERTSON.
THAWING APPARATUS.
(Application filed Feb. 15, 1898.)
(No Model.) 4 Sheets—Sheet 2.

Witnesses

Inventors
Charles Taylor
Charles E. Robertson
By their Attorney

No. 633,627. Patented Sept. 26, 1899.
C. TAYLOR & C. E. ROBERTSON.
THAWING APPARATUS.
(Application filed Feb. 15, 1898.)
(No Model.) 4 Sheets—Sheet 3.
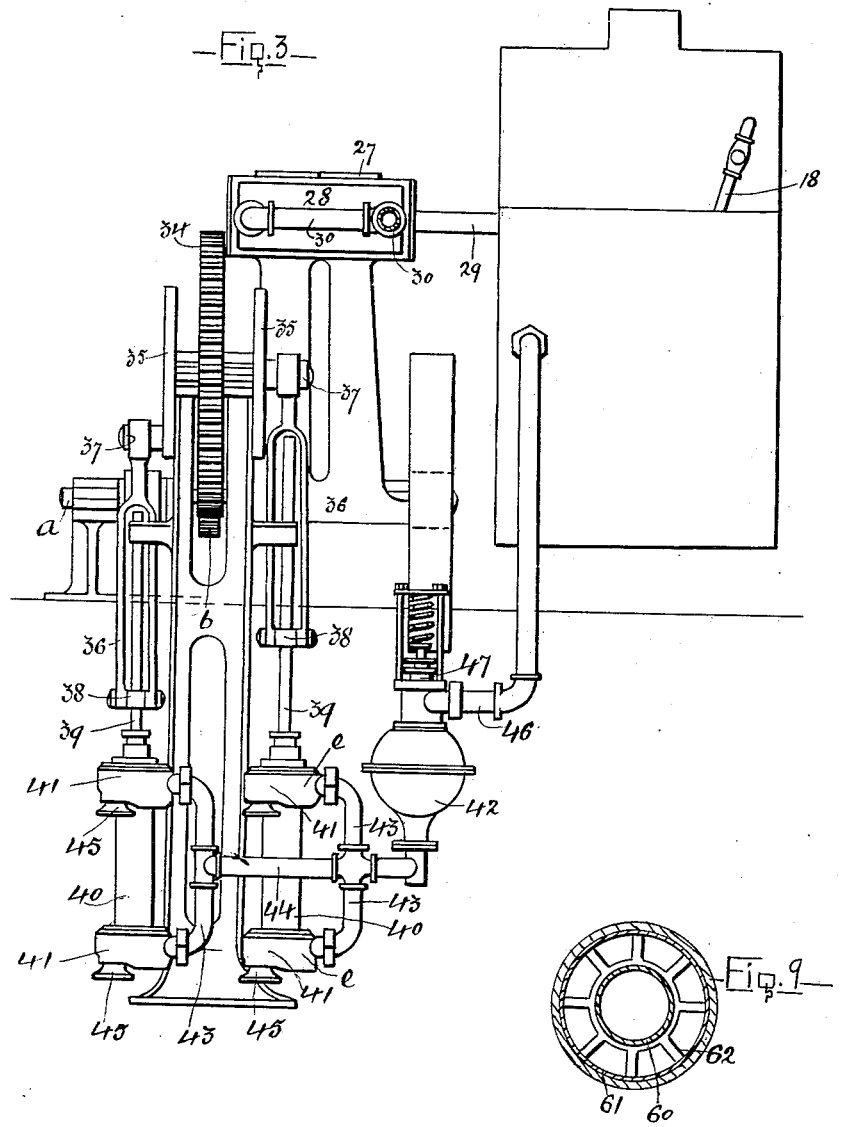

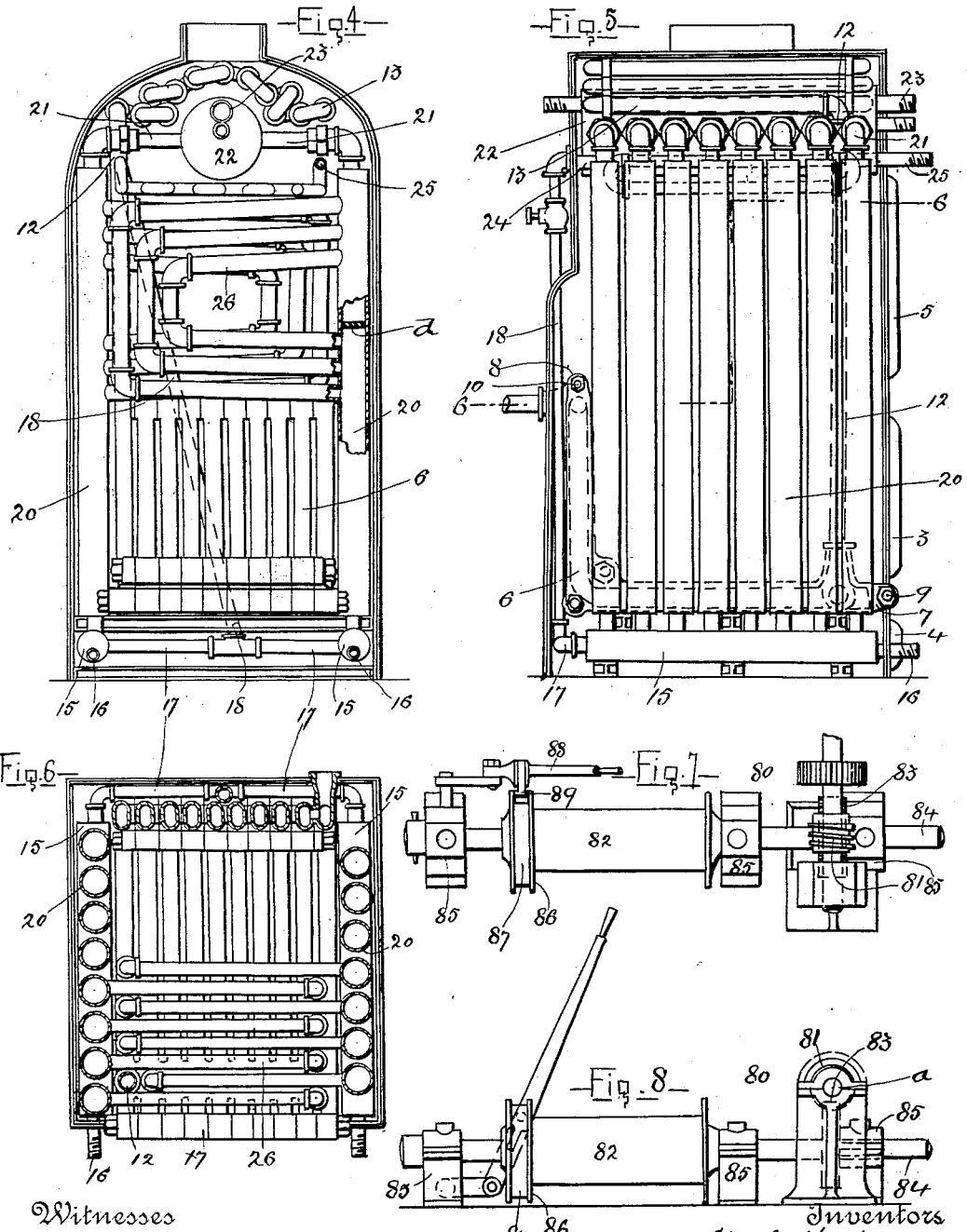
No. 633,627. Patented Sept. 26, 1899.
C. TAYLOR & C. E. ROBERTSON.
THAWING APPARATUS.
(Application filed Feb. 15, 1898.)
(No Model.) 4 Sheets—Sheet 4.
Witnesses
Inventors
Charles Taylor
Charles E. Robertson
By their Attorney

UNITED STATES PATENT OFFICE.

CHARLES TAYLOR AND CHARLES E. ROBERTSON, OF MONTREAL, CANADA.

THAWING APPARATUS.

SPECIFICATION forming part of Letters Patent No. 633,627, dated September 26, 1899.

Application filed February 15, 1898. Serial No. 670,443. (No model.)

*To all whom it may concern:*

Be it known that we, CHARLES TAYLOR and CHARLES EDWIN ROBERTSON, of the city of Montreal, Province of Quebec, Canada, have invented certain new and useful Improvements in Thawing Apparatus; and we do hereby declare that the following is a full, clear, and exact description of the same.

Our invention has for its object to produce an apparatus whereby air may be compressed, heated, and caused to act upon frozen substance, while simultaneously steam will be generated and utilized to drive the air-compressing portion of our apparatus and finally exhausted into a condenser, where it may be combined with ice or snow to provide water not only for feeding the boiler, but also for gold-washing purposes.

To these ends the invention may be said, briefly, to consist of a furnace the grate portion whereof is formed of a series of L-shaped tubular sections arranged side by side and communicating with one another and at one end of the series with an air-compressor, while the other end of said series is connected to a bank of coils located at the top of the interior of said furnace, said bank being in turn connected, preferably, by a flexible tubular connection to a portable and preferably conical heat-distributing device adapted to reflect the heat radiating from said air against the substance to be thawed and spray the heated air itself upon said substance. Distributed in an improved manner throughout the interior of the furnace is a series of water-sections connected at one end to any suitable feeding device, while its other end is connected to a steam-drum which is in turn connected to an engine adapted to drive the before-mentioned air-compressor, the exhaust-steam from said engine being taken to a condenser, preferably in the form of a cylinder, containing a coil of pipe, to which the exhaust-pipe is connected.

The heat-distributing device is of peculiar and novel construction, as may also be said of the conductor and several other parts of our invention; but for full comprehension thereof and of the foregoing reference must be had to the accompanying drawings, in which like symbols indicate the same parts, and wherein—

Figure 2:
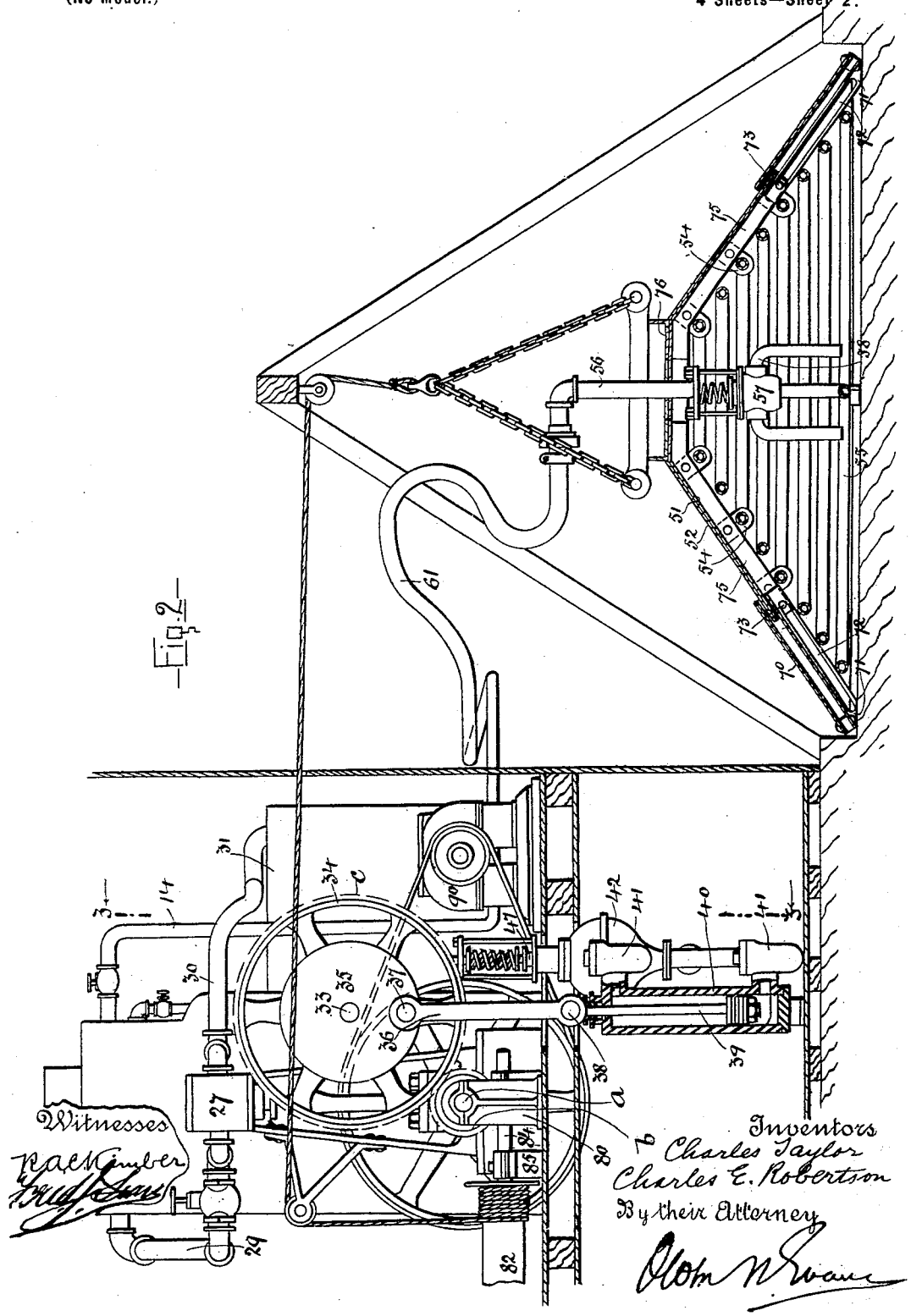

Figure 1 is a plan view of our improved apparatus with the distributing device partly in horizontal section. Fig. 2 is a side elevation thereof with the distributing device partly in vertical section; Fig. 3, a transverse vertical sectional view thereof, taken on line 3 3, Fig. 2; Fig. 4, a front elevation of our improved heater with the front thereof removed; Fig. 5, a left-hand side elevation with the adjacent side thereof removed; Fig. 6, a horizontal sectional view taken on line 6 6, Fig. 5; Fig. 7, a plan view of our improved winch; Fig. 8, a side view thereof; Fig. 9, a sectional view of our improved flexible tubular conductor.

Our improved heater consists, preferably, of a casing 2, having fire and ash-pit doors 3 and 4, respectively, and a door 5 to allow of access to the interior for cleansing purposes or repairs. The fire-grate is formed, preferably, of a series of L-shaped tubular sections 6, arranged a short distance apart and provided with perforated lugs 7 and 8 on their front and rear ends, respectively, the lugs 7 projecting through and supported by the front of the casing and receiving a bolt 9, while the lugs 8 receive a bolt 10, and these bolts through suitable nipples connect said sections 6 together in such a manner as to communicate with one another. The right-hand end section 6 is connected to the air-compressor, (to be presently described,) and the left-hand end section is connected by a vertical pipe 12 to one end of an irregularly-arranged bank of coils 13, located at the top of the furnace, the other end of this bank of coils having connected thereto a length of piping 14, adapted to be connected to the heat-distributing device to be presently described.

A pair of horizontal tubular water-sections 15, located one at each side of the open space below the grate, have their ends closed and the forward end of each provided with draw-off pipes 16, the rear ends being connected to the horizontal arms 17 of a T-pipe 18, while the upper sides of these sections 15 are connected to and communicate with a series of vertical tubular sections 20, arranged a short distance apart and communicating at their upper ends through pipes 21 with a steam-drum 22, which is connected through a pipe 23 with the engine, the upper end of the vertical arm of the T-pipe 18 being inclined to one side and connected to the end of one of a horizontal layer of coils 24, located immediately below the steam-drum and communicating through pipe 25 with any suitable water-supply. In order to increase the heat-receiving area of these water-heating sections, we arrange the vertical sections 20 at one side of the furnace opposite to the spaces between the corresponding vertical sections at the opposite side of the heater and provide each of said vertical sections with a series of three laterally inwardly extending U-shaped pipe-sections 26, arranged, preferably, as shown in Figs. 4 and 5, and divide each of said vertical sections by a diaphragm $d$, located transversely thereof at a point preferably a short distance above the point where the lower ends of the U-sections are connected, thus insuring that said U-section be included in the water-heating circuit.

The engine 27 (which may be of any preferred type) has its steam-chest 28 connected by a valve-controlled pipe 29 to the steam-drum 22 of the heater, and the exhaust therefrom is taken through pipe 30 to a condenser consisting, preferably, of a cylinder 31, having a helical coil of pipe 32 located therein, the end whereof is at the bottom of said cylinder and directed upwardly, thus enabling water to be heated, ice to be thawed, or any other like useful function to be performed. The crank-shaft $a$ of this engine is adapted to drive, through gears $b$ and $c$, a suitably-supported shaft 33, having a gear-wheel 34 and a pair of disks 35 mounted rigidly thereon. Each of these disks has one end of a pitman 36 pivotally connected, as at 37, the other end whereof is pivotally connected, as at 38, to the piston-rod 39 of a pump 40, said pumps constituting the means for compressing the air and each having duplex compression-chambers 41, all coupled together and with a main compression-chamber 42 by a double T-pipe having the ends of its four transverse arms 43 connected to and communicating with said minor compression-chambers 41 and the end of its longitudinal arm 44 connected to and communicating with the main compression-chamber 42, while said chambers 41 will be each furnished with an air-intake check-valve-controlled passage 45, the arms 43 also being furnished with suitable check-valves, (indicated at $e$,) but none of which check-valves are shown in detail, as they may be of any of the well-known constructions common to pumps. The discharge-pipe 46 of the main compression-chamber is connected, as before mentioned, to the right-hand end grate-bar section 6, and the passage of the compressed air therethrough is controlled and the extent of the compression of said air regulated by a variable check-valve 47, set, preferably, at one hundred pounds.

The heat-distributing device before mentioned constitutes one of the main features of our invention, and consists of a conical reflecting-shield 50, formed, preferably, of tin suitably braced, as will be presently described, and covered with layers of asbestos and felt 51 and 52, respectively, or other insulating material to enhance its heat-retaining qualities, while the outside periphery thereof has an annulus 53 secured thereto of a vertical thickness equal to the combined thickness of the layers of insulating material. Upon the inside of this reflecting-shield is hung, by brackets 54, a conically spirally coiled length of piping 55, having its upper end 56 projecting vertically and concentrically through the shield and the lower end thereof extended to the center of the shield and vertically offset and communicating through a variable check-valve 57 (set at preferably seventy-five pounds pressure) with a cross-pipe 58, the ends of the arms whereof are downwardly curved, while the upper end 56 of the conical coil is connected to one end of a tubular conductor, the other end whereof is connected to the outer end of the length of piping 14. This flexible tubular conductor consists, preferably, of a length of rubber piping 60, inclosed within a length of tin piping 61 and localized concentrically thereof by means of a series of spiders 62, arranged at intervals along the exterior of the said rubber pipe and having the ends of their arms bearing upon the interior of the tin pipe, and finally the exterior of the whole is covered by any suitable insulating material, but preferably felt.

It is obvious that in an apparatus as thus far described the air will be delivered to the heater under a pressure of one hundred pounds to the square inch, and as the valve controlling the delivery of the compressed air after having been heated is set at seventy-five pounds an excessively-strong jet will be discharged within the reflecting-cone, which, owing to its power of reflection, will keep the heat continually in contact with the substance over which the cone may be located, thus enabling a section of frozen earth to be quickly thawed and readily removed. In order to enable the diameter of this cone to be increased or reduced to accommodate different areas to be thawed, we provide same with a series of vanes 70, mounted at their outer ends rigidly upon bars 71, slotted, as at 72, to allow the passage therethrough of bolts 73, receiving nuts 74, adapted to retain said bars in sliding connection with a series of radial ribs 75, carrying said bolts 73, and connected at their inner and outer ends to a circular plate 76 and the before-mentioned annulus 53, respectively, and constituting the frame before mentioned of the hereinbefore-described conical reflector, the vanes 70 being constructed of tin and covered by insulating material in a similar manner to the cone, on the exterior of which they are adapted to slide.

As we have found that the power required to drive the air-compressor is considerably less than the power obtainable from the engine, we propose to utilize the superfluous power to drive an improved winch 80 for raising or lowering the heat-distributing device out of or into the ground and to drive a dynamo 90 for lighting purposes. Our improved winch is driven by a worm 81, mounted upon the crank-shaft $a$, and the novel feature in connection therewith consists in mounting the drum 82 and driving-pinion 83 thereof upon a second counter-shaft 84, supported in bearings 85, through which it is adapted to slide. Upon one end of this drum is secured a disk 86, having its periphery circumferentially grooved, as at 87, and a lever 88 is fulcrumed to the bearing adjacent to said disk and carries a block 89, adapted to take into said groove 87 and curved concentrically thereof. To arrest the movement of the drum, the lever should be moved to a vertical position, thus shifting the drum and with it the counter-shaft and moving the pinion 83 out of engagement with its actuating-worm, and to slacken the speed of the drum after it has been disconnected from its driving-gear it is only necessary to press the lever 88 toward said disk, thus causing the block 89 to act as a brake.

What we claim is as follows:

1. A thawing apparatus comprising a heat-reflecting device adapted to reflect heat upon the substance to be thawed, said reflecting device consisting of a cone having an inner reflecting-surface and its outer surface covered with insulating material and carrying a series of vanes projecting beyond the diameter thereof and adapted to be adjusted to increase or reduce the diameter of said cone, for the purpose set forth.

2. A thawing apparatus comprising a length of pipe coiled in conical form, a reflecting conical shield adapted to extend over said conical coil, and an outlet from said coil adapted to spray heated air upon the substance to be thawed, substantially as described and for the purpose set forth.

3. A thawing apparatus comprising a length of pipe coiled in conical form, a reflecting conical shield adapted to extend over said conical coil, and an outlet from said coil adapted to spray heated air upon the substance to be thawed, said conductor consisting of a tube constructed with a reflecting interior surface and covered with insulating material, substantially as described and for the purpose set forth.

4. A thawing apparatus comprising a length of pipe coiled in conical form, a reflecting conical shield adapted to extend over said conical coil, an air-heater, an air-supply to said heater, a conductor for the heated air connecting said air-heater to said coil and an outlet from said coil adapted to spray the heated air upon the substance to be thawed, said conductor consisting of a pair of tubes located one within the other, the outer tube being constructed with a reflecting interior surface and covered with insulating material, the inner tube being of sufficiently smaller diameter than the outer tube to provide a space between said tubes, and a series of spiders located at intervals along said inner tube and adapted to maintain the space between said tubes, for the purpose set forth.

5. A thawing apparatus comprising a combined steam-generator and air-heater; an engine; a communicating pipe connecting said steam-generator to said engine; an air-compressor, an operative connection between said engine and compressor, a communicating pipe connecting said air-compressor to said air-heater; an adjustable yielding check-valve adapted to control the passage through said pipe; a heat-distributing device; a flexible conductor connecting the air-heater to said distributing device; said distributing device comprising a coil of pipe having its discharge end controlled by an adjustable yielding check-valve, all arranged substantially as described and for the purpose set forth.

6. A thawing apparatus comprising a combined steam-generator and air-heater; an engine; a communicating pipe connecting said steam-generator to said engine; an air-compressor consisting of a pair of pumps each having duplex compression-chambers; an independent main compression-chamber; a double T-pipe connecting said duplex compression-chambers to said main compression-chamber; a communicating pipe connecting said main compression-chamber to said air-heater; an operative connection between said engine and compressor; an adjustable yielding check-valve adapted to control the passage through said pipe; a heat-distributing device; a flexible conductor connecting the air-heater to said distributing device; said distributing device comprising a coil of pipe having its discharge end controlled by an adjustable yielding check-valve, all arranged substantially as described and for the purpose set forth.

In testimony that we claim the foregoing as our invention we have signed our names in presence of two subscribing witnesses.

CHARLES TAYLOR.
CHARLES E. ROBERTSON.

Witnesses:
FRED. J. SEARS,
WILL P. McTEAL.